United States Patent [19]
Martin

[11] 3,883,628

[45] May 13, 1975

[54] SILICONE RELEASE AGENT

[75] Inventor: Eugene Ray Martin, Onsted, Mich.

[73] Assignee: Stauffer Chemical Company, Adrian, Mich.

[22] Filed: May 14, 1973

[21] Appl. No.: 360,276

[52] U.S. Cl. .............. 264/54; 106/38.22; 117/5.1; 117/5.3; 260/29.1 B; 260/33.2 SB; 260/33.6 SB; 260/33.8 SB; 260/46.5 G; 264/338
[51] Int. Cl. ..................... C08f 11/04; C08g 31/02
[58] Field of Search ............ 117/5.1, 5.3; 106/38.22; 264/54, 338; 260/46.5 G, 33.6 SB, 33.8 SB, 33.2 SB, 29.1 B

[56] References Cited
UNITED STATES PATENTS

| | | | |
|---|---|---|---|
| 3,341,646 | 9/1967 | Britain | 264/338 |
| 3,624,190 | 11/1971 | Cekada | 264/338 |
| 3,671,007 | 6/1972 | Bailey et al. | 264/338 |
| 3,684,756 | 8/1972 | Brooks | 106/38.22 |
| 3,694,530 | 9/1972 | Wolfe | 264/54 |

Primary Examiner—Ronald W. Griffin

[57] ABSTRACT

A mold release composition comprising a mixture of an organopolysiloxane and an aminofunctional silicon compound. This release composition is effective as a release agent between a metal mold and a cured urethane part.

10 Claims, No Drawings

SILICONE RELEASE AGENT

This invention relates to a novel release composition and more particularly to a mold release composition containing an organopolysiloxane and an aminofunctional silicon compound. The silicone release composition of this invention is particularly effective as a release agent for imparting release properties between a metal mold and a cured urethane part.

Heretofore various compositions such as silicone resins, blends of organopolysiloxanes and resins and organopolysiloxane fluids have been used as release agents in molding plastics and other materials. Generally, these release agents are applied to the mold surfaces prior to the introduction of the plastic, or other materials to be molded, or shaped. While these release agents have been satisfactory for some applications, they have certain disadvantages. For example, frequent applications of these release agents are required in order to obtain satisfactory release between the molded part and the mold surface. Where urethanes are used, the surface of the molded urethane part is generally disfigured by the release agents described above and as the temperature is increased to cure the urethane, the release properties are decreased.

Therefore it is an object of this invention to provide an improved silicone release composition for urethane systems. Another object of this invention is to provide a mold release composition which exhibits improved release characteristics when employed on urethane molds. Still another object of this invention is to provide a mold release composition which gives more releases per application. A further object of this invention is to provide a mold release composition which does not cause disfiguration of the part molded therein. A still further object of this invention is to provide a release composition which is less sensitive to the temperature employed in the curing of the molded urethane.

The foregoing objects and others which will become apparent from the following description are accomplished in accordance with this invention generally speaking, by providing a mold release composition comprising an organopolysiloxane fluid and an aminofunctional silicon compound.

Organopolysiloxane fluids used in this invention may be represented by the general formula

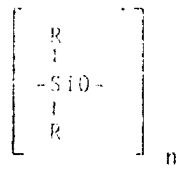

wherein the R (s), which may be the same, or different represent monovalent hydrocarbon radicals, or halogenated monovalent hydrocarbon radicals having from 1 to 18 carbon atoms and $n$ is a number greater than 20.

Radicals represented by R above are alkyl radicals, e.g., methyl, ethyl, propyl, butyl, octyl, dodecyl and octadecyl; aryl-radicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, α-phenyl ethyl, B-phenylethyl and α-phenylbutyl; and the halo substituted radicals enumerated above.

The organopolysiloxane may be any linear, or branched chained compound having an average of from 1.75 to 2.25 organic radicals per silicon atom. Generally it is preferred that the organopolysiloxane be free of terminal-hydroxyl groups; however, a small number of terminal-hydroxyl groups will not materially affect the release properties of the composition. The organopolysiloxane may have a minor amount of molecules having only one hydroxyl group, or there may be a small number of molecules carrying an excess of two hydroxyl groups; however, as mentioned previously it is preferred that the organopolysiloxane be substantially free of hydroxyl groups. In general the polysiloxane fluids should have a viscosity of between about 5 cs. and 1,000,000 cs., and more preferably between about 50 cs. and 300,000 cs., at 25°C. In addition, it is possible to combine high and low viscosity fluids to form a fluid having the desired viscosity range.

The aminofunctional silicon compounds employed in this composition may be prepared by mixing an organopolysiloxane with aminofunctional silanes, or siloxanes and thereafter equilibrating the mixture in the presence of a catalyst. Organopolysiloxanes which may be used in the preparation of these aminofunctional silicon compounds are cyclic siloxanes of the general formula:

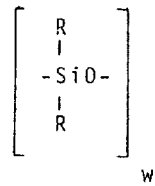

or linear, or branched organopolysiloxanes having the general formula $$R_y SiR_z O_{4-y-z}$$

in which R is the same as R above, $y$ is a number of from about 0.5 to 2.49, $z$ is a number of from 0.001 to 1 and the sum of $y$ and $z$ is a number of from 1 to 2.5 and $w$ is a number of from 3 to 10.

Examples of suitable cyclic organopolysiloxanes which may be used in the formation of these aminofunctional silicon compounds are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which $w$ has a value of from 3 to 4 are preferred.

Examples of linear, or branch chained siloxanes which may be used are triorganosiloxy end-blocked organopolysiloxanes such as trimethylsiloxy end-blocked polydimethylsiloxanes, poydiethylsiloxanes, polymethylphenylsilxoanes, polydiphenylsiloxanes and copolymers thereof.

The aminofunctional silanes, or siloxanes which are reacted with the organopolysiloxanes may be represented by the general formula

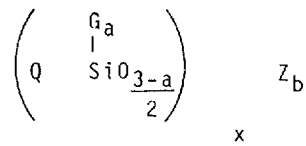

wherein G represents the radicals, R, OR', OR'' NR'$_2$, or OSiR$_3$ in which R is the same as R above, R' represents hydrogen, or monovalent hydrocarbon radicals having from 1 to 18 carbon atoms, R'' is a substituted, or unsubstituted divalent hydrocarbon radical having from 1 to 18 carbon atoms, a substituted, or unsubstituted divalent hydrocarbonoxy radical in which the oxygen is in the form of an ether linkage, or an unsaturated divalent hydrocarbon radical, Q represents the radicals.

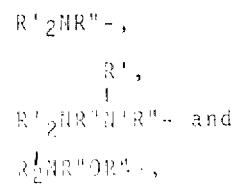

Z is a radical selected from the group consisting of R'O$_{0.5}$, R$_3$SiO$_{0.5}$ and R'$_2$NR''O$_{0.5}$, in which R, R' and R'' are the same as above, $a$ is a number of from 0 to 2, $b$ is a number of from 0 to 3 and $x$ is a number of from 1 to 20,000.

Examples of suitable divalent radicals represented by R'' are hydrocarbon radicals having from 1 to 18 carbon atoms, such as ethylene, trimethylene, tetramethylene, hexamethylene, octamethylene; hydrocarbonoxy radicals having the formula $(-OC_2H_4-)_r$, $(-OC_2H_4OCH_2-)_r$ and $(-OC_3H_6-)_r$ in which $r$ is a number of from 1 to 50, such as ethylene oxide, trimethylene oxide and polymers thereof and alkenylene radicals such as vinylene, propenylene, butenylene, hexenylene and the like.

Examples of suitable aminofunctional silanes and B-aminopropyltriethoxysilane, r-aminopropyltrimethoxysilane, methyl-B-(aminoethyl) r-aminopropyldimethoxysilane, omega-aminohexyltributoxysilane, B-(aminoethoxy) propyltrimethoxysilane, B-(aminoethoxy) hexyltriethyoxysilane, B-(aminopropoxy) butyltributoxysilane, methyl-B-(aminopropoxy) propyldi-(aminoethoxy) silane,

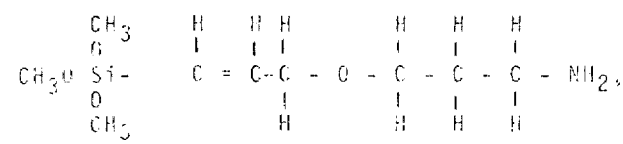

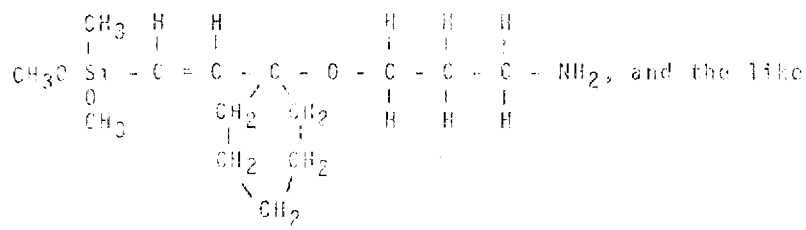

Representative examples of aminofunctional siloxanes are

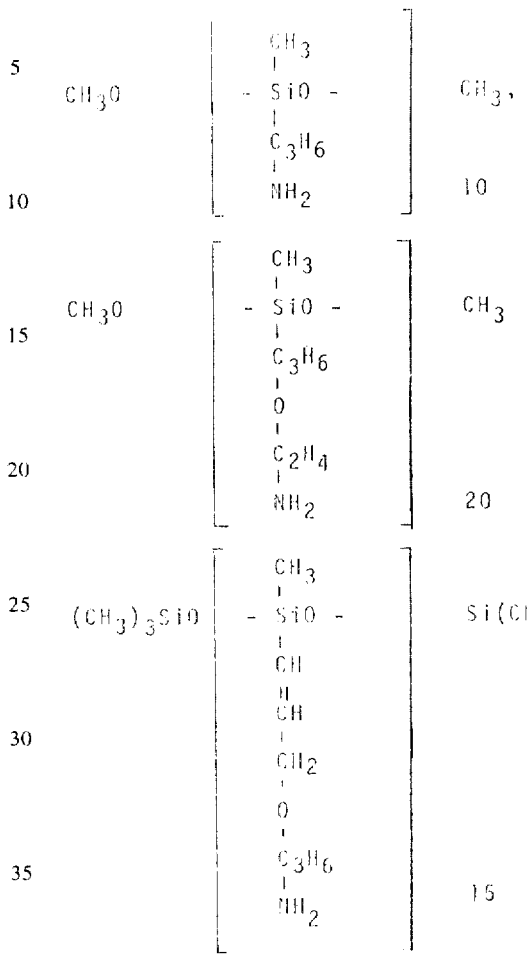

Si(CH$_3$)$_3$ and the like.

The aminofunctional silicon compounds are prepared by equilibrating a mixture containing an aminofunctional silane, or siloxane and organopolysiloxanes in the presence of a base catalyst.

Catalysts which may be employed in the equilibration reaction are bases such as hydroxides, e.g., sodium hydroxide, potassium hydroxide, cesium hydroxide, tetramethylammonium hydroxide and the like; alkali metal alkoxides, e.g., sodium butoxide and the like; alkali metal hydrides, e.g., sodium hydride and the like; silanolates, e.g., potassium silanolate, tetramethylammonium silanolate and the like; alkali metal alkyls, e.g., ethylsodium; alkali metal alkenyls; alkali metal aryls, e.g., biphenyl sodium, potassium naphthalene and the like. Even though other catalysts may be used, it is preferred that alkali metal hydroxides be employed in the equilibration reaction.

Although the amount of catalyst is not critical, it is preferred that from 0.0001 percent up to about 10 percent by weight of catalyst based on the weight of the aminofunctional silane, or siloxane be employed to effect equilibration.

Generally, it is desirable to remove, or destroy the catalysts after equilibration because their presence will adversely affect the properties of the resulting polymer. The catalysts may be removed, for example, by washing with water, or they may be destroyed by neutralizing with acidic reagents. In addition, certain catalysts may be destroyed by heating the reaction mixture to an elevated temperature after the equilibration reaction is completed.

The equilibration reactions may be conducted at any temperature ranging from about 25°C. up to about 200°C. over a period of time ranging from 0.5 hours up to several days in the presence, or absence of a solvent. It is preferred that the equilibration reaction be conducted in an inert atmosphere.

Generally, it is preferred that the equilibration be conducted in the absence of a solvent; however, when lithium containing catalysts are used, then it is preferred that the equilibration be conducted in the presence of "aprotic" solvents.

The term "aprotic solvent" is intended to mean any organic solvent which is free of active protons. These may include such solvents as various tertiary amines, such as triethylamine, tributylamine, pyridine and the like. Other suitable solvents are dimethyl sulfoxides, dioxane, alkyl ethers; glycols, such as diethylene glycol diethyl ether, diethylene glycol dimethyl ether, diethoxyethane, tetrahydrofuran and the like. These solvents are chosen such that their electron donating centers are capable of forming a coordination complex with the cation, thereby increasing its reactivity towards the diorganocyclosiloxane. Aprotic solvents which have Lewis base characteristics are preferably employed because of their ability to donate electrons to the cation, thereby coordinating with the cation and enhancing its reactivity by virtue of such coordination.

Certain other hydrocarbon aprotic systems which do not coordinate with the cation may be employed with the aprotic solvents described above to provide more intimate contact between the reactants. Examples of suitable hydrocarbon aprotic solvents are heptane, benzene, toluene, xylene and the like. It is preferred that from 0.05 to about 10 percent of an aprotic solvent having a Lewis base characteristic be employed and the remainder of the solvent may be selected from the hydrocarbon aprotic solvents.

The composition of this invention can contain from 0.1 percent to 90 percent by weight of the aminofunctional silicon compound and from 10 percent to 99.9 percent by weight of the organopolysiloxane. It is preferred that the composition contain from 1.0 to about 30 percent by weight of the aminofunctional silicon compounds and from 70 percent to 99 percent by weight of the organopolysiloxane based on the weight of the aminofunctional silicon compound and the organopolysiloxane. The character of the particular urethane system employed dictates the ratio of the organopolysiloxane fluid and aminofunctional silicon compound used in the release compositions.

Although it is not essential, the release compostion of this invention may be diluted with organic solvents and then applied to the mold surface by any technique conventional in the art, such as by spraying, brushing, or wiping on the mold surface. The weight percent of the release composition employed can be of from 0.1 percent to 99 percent, preferrably a solution containing from 1.0 to 20 percent by weight based on the weight of the release composition may be employed. Suitable examples of organic solvents are aliphatic hydrocarbons such as hexane, heptane, octane; aromatic hydrocarbons such as benzene, toluene, xylene, ethylbenzene, naphtha, halogenated hydrocarbons such as methylene chloride, perchloroethylene, trichloroethylene, carbon tetrachloride, ethers and polyethers such as diethyl ether, dimethyl ether, dibutyl ether, diethylene glycol dimethyl ether, diethylene glycol diethyl ether and the like. Preferably the solvent employed in this invention is methylene chloride or perchloroethylene.

Polyurethane articles which may be molded according to this invention are obtained by reacting an organic compound having at least two active hydrogen atoms as determined by the Zerewitinoff method with a polyisocyanate. Other reactants, such as chain extending agents, may also be employed, depending on the particular polyurethane article desired. Thus, in forming a cellular material, a gas-generating material, such as water is used.

A variety of polyfunctional isocyanates may be used, although diisocyanates are preferred in many formulations. Suitable polyfunctional isocyanates include alkylene diisocyanates such as hexamethylene diisocyanate and decamethylene diisocyanate, arylene diisocyanates such phenylene diisocyanates, toluene diisocyanates, naphthalene diisocyanates, 4,4'diphenylmethane diisocyanates, or isomers or mixtures of any of these. Triisocyanates typically obtained by the reaction of three moles of an arylene diisocyanate with one mole of hexanetriol, or of trimethyol propane, may be employed. A preferred polyisocyanate is a mixture of 80 percent 2,4-toluene diisocyanate and 20 percent 2,6-toluene diisocyanate.

The compounds having two, or more active hydrogen atoms as determined by the Zerewitinoff method, e.g., the polyalkylene polyols are reacted with the polyfunctional isocyanates to form urethane polymers. Polyalkylene polyols which have a molecular weight of at least about 500, include polyesters, polyethers, polyisocyanate modified polyesters, polyisocyanate modified polyester amides, alkylene glycols, polymercaptans, polyamines, polyisocyanate modified alkylene glycols, etc. It will be understood that these polyalkylene polyols may have active primary, or secondary hydroxyl groups. The polyalkylene polyol may be a hydroxyl-containing polyether, or polyester including fatty acid glycerides. Polyesters, which are a preferred type of polyalkylene polyol, may be obtained from the esterification and condensation reaction of e.g., an aliphatic dibasic carboxylic acid with a glycol, or a triol, or mixture thereof in proportions such that the resultant polyesters may contain predominately terminal-hydroxyl groups. Dibasic carboxylic acids suitable for preparing polyesters may include aliphatic and aromatic acids such as adipic acid, fumaric acid, sebacic acid, phthalic acid; suitable alcohols include ethylene glycols, diethylene glycols, trimethylol propane, etc. The fatty acid glycerides may include those having a hydroxyl number of at least about 50 such as castor oils, hydrogenated castor oil, or brown natural oils.

Polyethers, another preferred type of polyalkylene polyol, may include polyalkylene glycols, e.g., polyethylene glycols and polypropylene glycols preferably having a molecular weight of at least 200. For convenience, the term "polyol", or "polyalkylene polyol" may be employed to designate the substances having two, or more active hydrogen atoms as determined by the Zerewitinoff method.

Formation of the urethane polymers may be accomplished in a one-shot system by reacting the polyol with excess polyfunctional isocyanate in the presence of a catalyst. The polyfunctional isocyanate is typically present in an amount of from 5 percent to 300 percent, more preferably about 40 percent by weight of the polyol. The mixing of the constituents may be carried out at elevated temperature, or at room-temperature.

In a typical two-step operation, the polyol may be reacted with excess polyfunctional isocyanate and thereafter other agents may be added to the mixture.

When the polyurethane composition contains terminal-NCO groups, it may be cured by introducing organic compounds having a plurality of alcoholic hydroxyl groups, or amino groups. In particular, these curing agents may be defined as being low molecular weight organic polyols, or organic diamines. At least about 0.5 mole of organic diamine should be employed for every mole of free isocyanate group in the isocyanate-terminated organic liquid composition. Arylene diamines are preferred; however, aliphatic diamines may be used under certain circumstances. It is to be understood that the term "arylene diamines" means those compounds in which each of the two amino-groups is attached directly to an aromatic ring. Representative examples of preferred amines are 4,4'-methylene-bis(2-chloroaniline), 4,4'-methylene-bis(2-carbomethoxyaniline), 4,4'-diaminodiphenyldisulfide and 4,4'-diaminodiphenylsulfone. Other useful arylene diamines are 4,4'-methylene-bis(2-methylaniline), 4,4'-methylene-bis(2-methoxyaniline), 4,4'-methylene-bis(3-bromoaniline) and 4,4'-methylenedianiline and mixtures thereof. Aliphatic diamines which may be used include 1,6-hexamethylenediamine, diethylenediamine, 1,2-diaminopropane, ethylenediamine, cadaverine, piperazine and 2,5-dimethylpiperazine and the like.

It is frequently advantageous to accelerate the formation of the polyurethane article by introduction of a catalyst, particularly when preparing cellular materials using water to generate carbon dioxide as the foaming agent. These catalysts may be selected from a wide variety of tertiary amines, such as N-methyl morpholine, trimethylamine, triethylamine, diethanolamine, tripropylamine, amine, dimethyloctadecylamine, B-morpholinopropionamide, 3-diethylaminopropionamide. N,N,N,'N'-tetramethylethylenediamine and triethylenediamine. Dibutyltindilaurate and stanneous octoate are particularly useful for "one shot" foaming systems. Ferric acetylacetonate is often used to promote urethane formation.

Any of a wide variety of rigid, semi-rigid and resilient polyurethane products can be made by the process of this invention. In general, these polyurethane materials are prepared by the reaction of a relatively high molecular weight polyhydroxy compound, an organic polyisocyanate and optionally, a low molecular weight compound having at least 2 groups bearing Zerewitinoff active hydrogen atoms. If a cellular product is desired, a gaseous expanding agent is incorporated in the composition. This gaseous expanding agent may be carbon dioxide resulting from the reaction of water with the polyisocyanate with the simultaneous formation of urea crosslinks. It may also be a liquid, inert to the reactants which will vaporize at the temperature of the reaction and thereby cause expansion to the cellular material. Representative liquids which may be used include pentane and similar volatile aliphatic hydrocarbons; volatile polyhalogenated hydrocarbon compounds such as trichlorofluoromethane, which is preferred, dichlorodifluoromethane, trichlorotrifluoroethane, dichlorohexafluoropropane, monochloroheptafluorocyclobutane, dichlorodifluoroethylene and 2,3-dichloro-1,1,3,3-tetrafluoropropene-1.

The embodiments of this invention are further illustrated by the following examples in which all parts are by weights unless otherwise specified.

EXAMPLE 1

An aminofunctional silicon compound is prepared by heating a mixture containing about 266.4 parts of octamethylcyclotetrasiloxane, 22.4 parts of B-(aminoethyl)-r-aminopropyltrimethoxysilane and 0.29 parts of potassium naphthalene hydroxide to a temperature of 145°C. for 3 hours. After cooling the liquid product to room-temperature, 0.29 parts of acetic acid is added to neutralize the catalyst. The product is filtered and a liquid product having a viscosity of about 40 cs. at 25°C. is recovered. Nuclear Magnetic Resonance (N.M.R.) analysts indicates that the ratio of B-(aminoethyl)-r-aminopropyl to $OCH_3$ to $Me_2SiO$ groups is about 1:3:36.

About 15 parts of the aminofunctional silicon compound prepared above is mixed with 85 parts of a trimethylsilyl end-blocked polydimethylsiloxane having a viscosity of 350 cs. at 25°C. and the mixture is applied to the surface of a metal mold.

A urethane composition is prepared by mixing the following components in the order specified:

| COMPONENTS | PARTS |
|---|---|
| Polypropylene ether triol (mol. wt. 3000-Hydroxyl No. 56) | 200.0 |
| Copolymer of dimethylpolysiloxane, polypropylene oxide and polyethylene oxide (L-520 Union Carbide Chemical Co.) | 3.0 |
| Stannous octoate | 0.4 |
| Triethylenediamine | 1.2 |
| Water | 7.4 |
| Trichlorofluoromethane | 10.0 |
| Toluene diisocyanate | 96.0 |

The mixture is poured into a mold and heated to a temperature of about 121°C. for a period of about 20 minutes. The mixture which fills the mold with a tack-free resilient foam is easily released from the mold.

The above process is repeated several times and each time the tack-free resilient foam is easily removed from the mold.

EXAMPLE 2

For purposes of comparison, a release agent containing 7.5 parts of silicone resin, 42.5 parts of trimethylsilyl end-blocked dimethylpolysiloxane fluid having a viscosity of 350 cs. at 25°C. and 50 parts of mineral spirits is applied to the mold surface. The urethane composition described in Example 1 is poured into the mold and heated in accordance with the procedure described in Example 1. Poor release properties are observed after casting two urethane parts.

EXAMPLE 3

The procedure of Example 1 is repeated except that a trimethylsilyl end-blocked dimethylpolysiloxane having a viscosity of 200 cs. at 25°C. is substituted for the aminofunctional silicon compound organopolysiloxane release agent. Poor release properties are observed after casting only one urethane part.

EXAMPLE 4

The procedure of Example 1 is repeated except that the aminofunctional silicon compound described in Example 1 is employed as the release agent. The resilient foam could not be separated from the mold.

applied to a metal mold, several castings are obtained with good release properties after each casting.

EXAMPLE 6

The procedure of Example 1 is repeated except the urethane composition is prepared by mixing the following components:

| COMPONENTS | PARTS |
| --- | --- |
| Polypropylene ether triol (mol. wt. 3000—Hydroxyl No. 56) | 200.0 |
| Stannous octoate | 0.8 |
| Triethylenediamine | 2.4 |
| Toluene Diisocyanate | 30.0 |

The mixture is poured into a mold and heated to a temperature of about 60°C. for a period of about 20 minutes. The rigid urethane part thus formed is easily released from the mold.

The above process is repeated several times and each time the rigid urethane part is easily removed from the mold.

EXAMPLES 7 thru 17

The procedure of Example 6 is repeated using various release compositions within the scope of this invention. The following table illustrates various release compositions and their release properties.

TABLE

| | | Release Agent Composition | | | | | | |
| --- | --- | --- | --- | --- | --- | --- | --- | --- |
| | | Aminofunctional Organopolysiloxane Polymer | | | | | | |
| Ex. No. | Aminofunctional Group | $R_2SiO$- Unit | RO- Group | $R_3SiO$- Units | Mole ratio Aminofunctional $R_2SiO:OR:R_3SiO$: Groups | Weight % | Weight % tri-methylsilyl-endblocked dimethylpoly-siloxane | No. of urethane parts cast before poor release was observed |
| 7 | — | — | — | — | — | None | None | 0 |
| 8 | $NH_2C_2H_4OC_3H_6SiO_{1.5}$ | $(CH_3)_2SiO$ | $CH_3O$ | 0 | 1.0:75:3:0 | 30 % | 70 % | 4 |
| 9 | $NH_2C_2H_4NHC_3H_6SiO_{1.5}$ | $(CH_3)_2SiO$ | $CH_3O$ | 0 | 1.0:125:3:0 | 8 % | 92 % | 4 |
| 10 | $NH_2C_2H_4NHC_3H_6SiO_{1.5}$ | $(CH_3)_2SiO$ | $CH_3O$ | 0 | 1.0:150:3:0 | 2.5 % | 97.5 % | 1 |
| 11 | $NH_2C_2H_4NHC_4H_6SiO_{1.5}$ | $(CH_3)_2SiO$ | $CH_3O$ | 0 | 1.0:12:3:0 | 8.0 % | 92 % | 3 |
| 12 | $NH_2C_2H_4NHC_3H_6SiO_{1.5}$ | $(CH_3)_2SiO$ | 0 | $ME_3SiO$ | 1.0:35:0:2.0 | 10 % | 90 % | 5 |
| 13 | $NH_2C_3H_6SiO_{1.5}$ | $(CH_3)_2SiO$ | $C_2H_5O$— | 0 | 1.0:125:3.0:0 | 15 % | 85 % | 4 |
| 14 | $NH_2C_3H_6SiO_{1.5}$ | $(CH_3)_2SiO$ | 0 | $ME_3SiO$ | 1.0:100:0.3.0 | 5.0 % | 95 % | 4 |
| 15 | $NH_2C_3H_6SiO_{1.5}$ | $(CH_3)_2SiO$ | $C_2H_5O$ | 0 | 1.0:140:3.0:0 | 3 % | 97 % | 1 |
| 16 | $NH_2C_3H_6SiO_{1.5}$ | $(CH_3)_2SiO$ | $C_2H_5O$— | 0 | 1.0:500:3.0:0 | 45 % | 65 % | 4 |
| 17 | $NH_2O_3H_6SiO_{1.5}$ | $(CH_3)_2SiO$ | $C_2H_5C$— | 0 | 1.0:1000:3.0:0 | 75 % | 25 % | 3 |

This example shows that the aminofunctional silicon compounds are poor release agents for urethanes when used alone.

EXAMPLE 5

The procedure of Example 1 is repeated except that the aminofunctional silicon compound is prepared by reacting 9 parts of B-(aminoethoxy) propyltrimethoxysilane, 316 parts of hexamethylcyclotrisiloxane and 0.3 parts of n-butyllithium at a temperature of about 125°C. The resultant product which is neutralized with 0.3 parts of acetic acid has a viscosity of about 125 cs. at 25°C. The ratio of B-(aminoethoxy) propyl groups to $OCH_3$ groups to $Me_2SiO$ groups is about 1:3.1:98.

When the above composition is combined with the trimethylsilyl end-blocked polydimethylsiloxane and While specific embodiments of the invention have been described, it should not be limited to the particular compositions described therein. It is intended, therefore, to include all modifications within the spirit and scope of this invention.

What is claimed is:

1. A release composition for molding polyurethanes which comprises a mixture containing an organopolysiloxane fluid having the general formula $$(R_2SiO)_n$$

in which R represents an organic radical having from 1 to 18 carbon atoms selected from the group consisting of monovalent hydrocarbon radicals and halogenated monovalent hydrocarbon radicals, n is a number greater than 20 and from 0.1 to 90 percent by weight of an aminofunctional silicon compound based on the total weight of the aminofunctional silicon compound and the organopolysiloxane fluid, said aminofunctional silicon compound is obtained from the equilibration of an organopolysiloxane and an aminofunctional silane or siloxane in the presence of a base catalyst.

2. The composition of claim 1 wherein the organopolysiloxane used in the preparation of the aminofunctional silicon compound is represented by the formula

in which R is an organic radical having from 1 to 18 carbon atoms selected from the group consisting of monovalent hydrocarbon radicals and halogenated monovalent hydrocarbon radicals and $w$ is a number of from 3 to 10.

3. The composition of claim 1 wherein the organopolysiloxane used in the preparation of the aminofunctional silicon compound is represented by the formula $$R_y SiR_z O_{4-y-z}$$

in which R is selected from the group consisting of monovalent hydrocarbon radicals and halogenated monovalent hydrocarbon radicals, $y$ is a number of from about 0.5 to 2.49, $z$ is a number of from 0.001 to 1 and the sum of $y$ and $z$ is a number of from 1 to 2.5.

4. The composition of claim 1 wherein the aminofunctional silane, or siloxane is represented by the formula

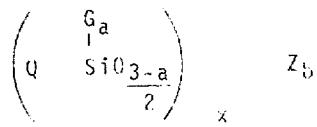

in which G is selected from the group consisting of R, OR', OSiR$_3$ and OR'' NR'$_2$ in which R is an organic radical having from 1 to 18 carbon atoms selected from the group consisting of monovalent hydrocarbon radicals and halogenated monovalent hydrocarbon radicals, R' is selected from the group consisting of hydrogen and monovalent hydrocarbon radicals having from 1 to 18 carbon atoms, R'' is selected from the group consisting of substituted and unsubstituted divalent hydrocarbon radicals, substituted and unsubstituted divalent hydrocarbonoxy radicals in which the oxygen is in the form of an ether linkage and unsaturated divalent substituted and unsubstituted hydrocarbon radicals, Q is selected from the group consisting of R'$_2$NR''—, R'$_2$NR'' NR''—, and

R'$_2$NR''OR'',

Z is selected from the class consisting of R'O$_{0.5}$, R$_3$SiO$_{0.5}$ and R'NR''O$_{0.5}$, $a$ is a number of from 0 to 2, $b$ is a number of from 0 to 3 and $x$ is a number of from 1 to 20,000.

5. The composition of claim 1 wherein the aminofunctional silicon compound is present in an amount of from 1.0 to 30 percent by weight based on the total weight of the aminofunctional silicon compound and the organopolysiloxane fluid.

6. The composition of claim 1 wherein the organopolysiloxane fluid is a polydimethylsiloxane.

7. The composition of claim 1 wherein the organopolysiloxane fluid and aminofunctional silicon compound is diluted with an organic solvent.

8. In the process of preparing polyurethane articles which comprises reacting an organic polyisocyanate with an organic compound having at least two groups bearing Zerewitinoff active hydrogen atoms and allowing the resultant mixture to gel and become tack-free, the improvement of obtaining multiple releases between a mold surface and said polyurethane articles when successively molded therein by the steps of maintaining the ungelled reaction mixture in contact with a solid surface having a release agent thereon until said reaction mixture has gelled and become tack-free, said release agent comprising a mixture of an organopolysiloxane fluid of the general formula:

$$(R_2SiO)_n$$

in which R represents an organic radical having from 1 to 18 carbon atoms selected from the group consisting of monovalent hydrocarbon radicals and halogenated monovalent hydrocarbon radicals, $n$ is a number greater than 20 and from 0.1 to 90 percent by weight of an aminofunctional silicon compound based on the total weight of the aminofunctional silicon compound and the organopolysiloxane fluid, said aminofunctional silicon compound is obtained from the equilibration of an organopolysiloxane and an aminofunctional silane or siloxane in the presence of a base catalyst.

9. The process of claim 8 wherein a gaseous expanding agent is generated in the reaction mixture resulting from the reaction of said organic polyisocyanate with the organic compound before said reaction mixture has gelled and become tack-free, whereby the polyurethane articles obtained are cellular.

10. The process of claim 8 wherein the release agent is diluted with an organic solvent.

* * * * *